United States Patent [19]

Kawamori et al.

[11] Patent Number: 5,158,697
[45] Date of Patent: Oct. 27, 1992

[54] DEINKING AGENT FOR REPRODUCTION OF PRINTED WASTE PAPERS

[75] Inventors: Yukiyoshi Kawamori, Kakogawa; Susumu Monno, Takasago; Yoshiharu Hashiguchi, Kakogawa; Yoshikazu Inoue, Kakogawa; Masao Hamada, Kakogawa, all of Japan

[73] Assignee: Harima Chemicals, Inc., Hyogo, Japan

[21] Appl. No.: 568,881

[22] Filed: Aug. 17, 1990

[30] Foreign Application Priority Data

Oct. 26, 1989 [JP] Japan .................................. 1-280455
Nov. 9, 1989 [JP] Japan .................................. 1-293164
Dec. 22, 1989 [JP] Japan .................................. 1-333052

[51] Int. Cl.$^5$ .......................... C09K 3/00; C09K 3/32; D21C 5/02
[52] U.S. Cl. ...................................... 252/60; 252/61; 162/5; 162/4
[58] Field of Search ................... 252/60, 61; 162/4, 5; 528/295.3, 296, 312

[56] References Cited

U.S. PATENT DOCUMENTS

| | | | |
|---|---|---|---|
| 4,360,439 | 11/1982 | Calmanti et al. | 252/61 |
| 4,561,933 | 12/1985 | Wood et al. | 162/5 |
| 4,666,558 | 5/1987 | Wood et al. | 162/5 |
| 4,959,123 | 9/1990 | Lehmann et al. | 162/5 |
| 4,964,949 | 10/1990 | Hamaguchi et al. | 252/61 |
| 4,971,656 | 11/1990 | Lehmann et al. | 162/5 |

FOREIGN PATENT DOCUMENTS

| | | |
|---|---|---|
| 117690 | 7/1982 | Japan . |
| 186592 | 8/1986 | Japan . |
| 182488 | 7/1988 | Japan . |
| 182489 | 7/1988 | Japan . |
| 227880 | 9/1988 | Japan . |

Primary Examiner—Prince Willis, Jr.
Assistant Examiner—J. Silbermann
Attorney, Agent, or Firm—Birch, Stewart, Kolasch & Birch

[57] ABSTRACT

The present invention relates to an deinking agent used for reproduction of printed waste papers such as newspapers, magazines, leaflets and the like, and mainly contains one or more additives selected from the group comprising (a) additives made by adding one or more selected from alkylene oxides to at least one selected from dimer acids and polymer acids of higher unsaturated fatty acids having a carbon number of 16-20;
(b) additives made by adding one or more selected from alkylene oxides to at least one selected from partial esters which are made of an alcohol having a carbon number of 1-18 and dimer acids and polymer acids of higher unsaturated fatty acids having a carbon number of 16-20;
(c) additives made by adding one or more selected from alkylene oxides to one or more selected from dicarboxylic acids or dicarboxylic acid monoesters.

5 Claims, No Drawings

DEINKING AGENT FOR REPRODUCTION OF PRINTED WASTE PAPERS

SUMMARY OF THE INVENTION

1. Field of the Invention

The present invention relates to a deinking agent used for the recycling and reproduction of printed waste papers such as newspapers, magazines, leaflets and the like. Specifically, the present invention relates, to a deinking agent by which bright deinked pulp having little residual ink can be obtained, due to the increased characteristics of foaming, and collecting ink upon treating the newspapers, magazines and the like by deinking process with a flotation treatment.

2. Description of the Related Arts

Reproduction of newspapers, magazines and the like, to reuse them has been carried out for a long time, and the importance of the effective use of the waste papers is particularly increasing in view of forest protection and the increased application of the deinked pulp.

A widely used method for reproducing the printed waste papers takes the following steps; namely, the printed waste paper is disaggregated in a disaggregating device together with alkaline chemicals such as caustic soda, silicate soda and the like, and deinking agents, and furthermore, bleaching agents such as hydrogen peroxide, hyposulfite and the like, metallic ion enclosing agents such as EDTA, DTPA and the like is added if necessary, so that the ink can be disconnected. Then, separation of the disconnected ink from the pulp is widely carried out by a water washing treatment and a flotation treatment.

The deinking agent can roughly be classified into two types; one is a dispersing type one by which the disconnected ink in a finely dispersed state is removed to the outside of the system, and the other is an aggregating type one by which the disconnected ink in a more or less aggregated state is removed to the outside of the system. The aggregating type is now widely used since brighter reproduced pulp can be obtain.

Anion activators such as alkylbenzene sulfonate, higher alcohol sulphuric acid ester, α-olefin sulfonate and the like; nonionic active agents such as polyoxyalkylene alkylether, polyoxyalkylene alkylarylether, fatty acid alkanolamide and the like; or higher fatty acid are used solely or more than two kinds of them are mixed to be used as the deinking agent. However, although higher fatty acid type presents a high effect of the ink aggregation, problems rises due to the insufficient ink removal resulting from its low permeability into the pulp, the low effect of the ink removal and low foaming property. On the other hand, alkylene oxide additives such as polyoxyalkylene alkylether and the like (for example, Toku-ko-sho 64-11756, Toku-kai-sho 63-303190 and Toku-kai-hei 1-111086) have high permeability into the pulp and a high effect of the disconnection and dispersion of the ink; however, due to the low affinity thereof toward the ink, the effect of the aggregation is yet insufficient.

The improvement of printing techniques, especially the use of offsets of ink has brought changes in composition of the ink, in which dry oils and thermosetting resin are employed. Due to this, the ink film are strongly hardened and it has become difficult to disconnect the ink to separate it from the pulp with the conventional deinking agent, which accordingly makes it impossible to obtain an the deinked pulp of a high quality.

Further in accordance with the increased application of the deinked pulp, brighter deinking agent pulp having little residual ink is demanded.

Therefore, an object of the present invention is to provide an deinking agent capable of easily removing the ink of the waste papers in which the ink is difficult to be disconnected and separated by the above conventional method.

As a result of research, it has been found that it is necessary that the deinking agent having both high deinking effect and the high effect of ink aggregation and foaming to accomplish the object, and also that the above-mentioned required physical properties can be provided by adding alkylene oxide to dimer acids or polymer acids of higher unsaturated fatty acids, or partial ester thereof, or particular dicarboxylic acid or monoester thereof.

Namely, according to the present invention, the deinking agent for reproducing waste papers mainly contains one or more additives selected from the group comprising (a) additives made by adding one or more selected from alkylene oxides to at least one selected from dimer acids and polymer acids of higher unsaturated fatty acids having a carbon number of 16~20;

(b) additives made by adding one or more selected from alkylene oxides to at least one selected from partial esters which are made of an alcohol having a carbon number of 1~18 and dimer acids and polymer acids of higher unsaturated fatty acids having a carbon number of 16~20;

(c) additives made by adding one or more selected from alkylene oxides to one or more selected from dicarboxylic acids or dicarboxylic acid monoesters represented by the following formula (I):

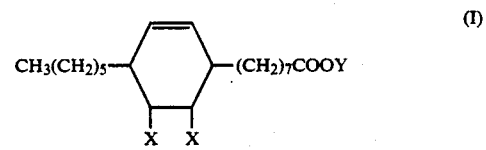

wherein either one of Xs is COOH and the other X is H or $CH_3$; Y is H or R and R is an alkyl group having a carbon number of 1~18.

In the present invention, the dimer acids or polymer acids of higher unsaturated fatty acids having a carbon number of 16~20, can be obtained by polymerization of mono-en acids or di-en acids of unsaturated fatty acids. For instance, they can be made by thermal polymerization and the like of unsaturated fatty acid monomer such as oleic acid, linoleic acid, linolenic acid and the like. A dimer acid having carbon number of 36, a trimer acid having carbon number of 54 and a mixture thereof, which are produced by the thermal polymarization of oleic acid and linoleic acid, are presently commercially available. Their molecular structures are not obvious and they are offered for industrial use as mixtures of various isomers. It is preferably to use HARI-DIMER (produced by HARIMA CHEMICAL INDUSTRY CO. LTD.) which can be obtained by polymerization of a fatty acid of tall oil or one made by polymerization of soybean oil. In the present invention, it is allowable to contain a small quantity of monomer acids in the dimer acid and polymer acid.

In the partial ester made from an alcohol of C 1-18 and a dimer acid and/or trimer acid, primary, secondary and tertiary alcohols as methanol, ethanol, isopropanol, n-butanol, isobutanol, sec-butanol, tertbutanol, amyl-alcohol, hexyl-alcohol, lauryl-alcohol, oxosynthetic and other synthetic alcohol mixtures, stearyl-alcohol and the like may be employed as alcohols having carbon number of 1~18 used for partial esterification. In view of esterification and properties after adding alkylene oxide, alcohols having carbon number of 5~12 are particularly preferable.

As for partial esterification, the stoichiometry of esterification is preferably so determined that at least one molecule of carboxylic acid is remained per molecule of the dimer acid and polymer acid. The reaction of partial esterification of the dimer acid and polymer acid by the aforementioned alcohols can be carried out by a known process.

The basic structure of dicarboxylic acid or the monoester of dicarboxylic acid employed in the present invention is shown as the following formula (II):

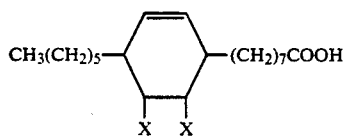
(II)

where X is defined the same as in the above formula (I), as is disclosed in Japanese Toku-kai-sho 49-66659 and U.S. Pat. No. 3,899,476. DIACID-1550 (sold by HARIMA CHEMICAL INDUSTRY CO. LTD.), which is a mixture of 90% of dicarboxylic acid; 9% of monocarboxylic acid; and unsaponifiable substance, may be employed. The monoester of dicarboxylic acid can be obtained by reacting a primary carboxyl group of dicarboxylic acid represented by the above formula (II) with one or more of alcohols represented by the formula ROH wherein R is an alkyl group with carbon number of 1~18, preferably 1~15, such as methanol, isopropanol, butanol, hexanol, octanol, lauryl alcohol, and other synthetic alcohols obtained by a known process. It is allowable to contain a small quantity of monomer acids in the dimer acid and polymer acid.

On the other hand, as an alkylene oxide employed in the present invention, ethylene oxide, propylene oxide and butylene oxide may be exemplified. One or more alkylene oxides may be added at the same time. In the case of addition of more than two kinds of alkylene oxides, random addition or block addition may be carried out. It is the most preferably to have ethylene oxide and propylene oxide combined by the random addition or block addition. The addition molar number of the alkylene oxide is preferably below 300. When adding the alkylene oxide of more than 300 moles, foaming is decreased upon the flotation process of deinking, and the aggregation of the ink having been disconnected is deteriorated, and accordingly reproduced pulp of a high quality can not be obtained. The most preferably addition molar number of the alkylene oxide is 10~200, and particularly in the case of the aforementioned compound (c), the most preferably addition molar number of the alkylene oxide is 10~120.

The method of addition reaction is not particularly restricted; for example, an alkaline substance is added as a catalyst to the aforementioned compounds (a)~(c) and blowing alkylene oxide thereinto at 100°~200° C. under 1~5 kg/cm² to derive the reaction for a few hours, thus obtain an addition product.

The deinking agent according to the present invention is added preferably prior to a process in a pulper or an aging tower, however, it may also be added to a floatator. A sufficient deinking effect can be obtained with this deinking agent alone; however, other deinking agents such as anion activator or nonionic active agents such as polyoxyalkylene alkylether and the like, or higher fatty acids may also be used together with the deinking agent of this invention.

As a result of adding alkylene oxide to a dimer acid or polymer acid of a higher unsaturated fatty acid, or partial ester of an alcohol thereof, or particular dicarboxylic acid or a monoester thereof, the deinking agent according to the present invention is superior in its permeability into the ink and the effect of disconnection of the ink. Furthermore, compared to the conventional deinking agents, it exhibits very excellent abilities of foaming and aggregation of ink. Accordingly, the bright reproduced pulp of a high quality, which has little residual ink, can easily be obtained.

EXAMPLE 1

484 g of HARIDIMER 250 from HARIMA CHEMICAL INDUSTRY Co. Ltd., which is made by polymerization of tall oil fatty acid to have 193 of acid number and 605 of average molecular weight and is composed of dimer acid 79 wt %, trimer acid 18 wt % and monomer acid 3 wt % was fed into a pressure reactor and then 2.4 g of caustic potash was added thereto. The mixture was heated to 170° C. to be deaerated and after nitrogen gas was filled in the reactor, 211.4 g of ethylene oxide was blown thereinto over 3 hours with a pressure of 1~5 kg/cm² and was reacted with the mixture to obtain an addition polymer of ethylene oxide 6 mole as a deinking agent.

EXAMPLE 2

Reaction was carried under the same condition as the above Example 1, except using 242 g of HARIDIMER 250, 1.2 g of caustic potash and 704.8 g of ethylene oxide, to obtain an addition polymer of ethylene oxide 40 mole as a deinking agent.

EXAMPLE 3

121 g of HARIDIMER 250 from HARIMA CHEMICAL INDUSTRY Co. Ltd. which is made by polymerization of tall oil fatty acid to have 193 of acid number and 605 of average molecular weight and is composed of dimer acid 79 wt %, trimer acid 18 wt % and monomer acid 3 wt % was fed into a pressure reactor and then 0.6 g of caustic potash was added thereto. The mixture was heated to 170 to be deaerated and after nitrogen gas was filled in the reactor, 176.2 g of ethylene oxide was blown thereinto over 3 hours with a pressure of 1~5 kg/cm² and then 232.3 g of propylene oxide was blown thereinto over 3 hours with a pressure of 1~5 kg/cm² to obtain an addition polymer of ethylene oxide 20 mole and propylene oxide 20 mole as a deinking agent.

EXAMPLE 4

Reaction was carried under the same condition as the above Example 3, except using 352.4 g of ethylene oxide and 144.2 g of butylene oxide as an alkylene oxide, to obtain an addition polymer of ethylene oxide 40 mole and butylene oxide 10 mole as a deinking agent.

EXAMPLE 5

Reaction was carried under the same condition as the above Example 3, except using 352.4 g of ethylene oxide and 232.3 g of propylene oxide as an alkylene oxide, to obtain an addition polymer of ethylene oxide 40 mole and propylene oxide 20 mole as a deinking agent.

EXAMPLE 6

Reaction was carried under the same condition as the above Example 3, except using 352.4 g of ethylene oxide and 464.6 g of propylene oxide as an alkylene oxide and blowing propylene oxide over 4 hours, to obtain an addition polymer of ethylene oxide 40 mole and propylene oxide 40 mole as a deinking agent.

EXAMPLE 7

Reaction was carried under the same condition as the above Example 3, except using 352.4 g of ethylene oxide and 464.6 g of propylene oxide as an alkylene oxide and blowing ethylene oxide and propylene oxide at the same time over 6 hours, to obtain an random addition polymer of ethylene oxide 40 mole and propylene oxide 40 mole as a deinking agent.

EXAMPLE 8

Reaction was carried under the same condition as the above Example 6, except using 352.4 g of ethylene oxide and 464.6 g of propylene oxide as an alkylene oxide and blowing propylene oxide and thereafter ethylene oxide, to obtain an addition polymer of ethylene oxide 40 mole and propylene oxide 40 mole as a deinking agent.

EXAMPLE 9

Reaction was carried under the same condition as the above Example 6, except using 352.4 g of ethylene oxide and 929.3 g of propylene oxide as an alkylene oxide, to obtain an addition polymer of ethylene oxide 40 mole and propylene oxide 80 mole as a deinking agent.

EXAMPLE 10

Reaction was carried under the same condition as the above Example 3, except using 881.0 g of ethylene oxide and 1161.6 g of propylene oxide as an alkylene oxide and blowing ethylene oxide over 4 hours and propylene oxide over 5 hours, to obtain an addition polymer of ethylene oxide 100 mole and propylene oxide 100 mole as a deinking agent.

EXAMPLE 11

Reaction was carried under the same condition as the above Example 6, except using HARIDIMER 250 from HARIMA CHEMICAL INDUSTRY Co. Ltd. which is made by polymerization of tall oil fatty acid to have 195 of acid number and 566 of average molecular weight and is composed of dimer acid 97 wt %, trimer acid 2 wt % and monomer acid 1 wt % and using 376.7 g of ethylene oxide and 496.7 g of propylene oxide as an alkylene oxide, to obtain an addition polymer of ethylene oxide 40 mole and propylene oxide 40 mole as a deinking agent.

EXAMPLE 12

Reaction was carried under the same condition as the above Example 11, except using HARIDIMER 500 from HARIMA CHEMICAL INDUSTRY Co. Ltd. which has 190 of acid number and 774 of average molecular weight and is composed of dimer acid 25 wt %, trimer acid 75 wt % and using 413.2 g of ethylene oxide and 544.8 g of propylene oxide, to obtain an addition polymer of ethylene oxide 60 mole and propylene oxide 60 mole as a deinking agent.

EXAMPLE 13

Reaction was carried under the same condition as the above Example 12, except using 619.8 g of ethylene oxide and 272.4 g of propylene oxide, to obtain an addition polymer of ethylene oxide 90 mole and propylene oxide 30 mole as a deinking agent.

COMPARATIVE EXAMPLES 2~5

Reaction was carried under the same condition as the above Examples, except using oleic acid, stearic acid and lauryl alcohol instead of the above polymerization of tall oil fatty acid, to obtain oleic acid $(EO)_{20}(PO)_{10}$, oleic acid $(EO)_{20}(PO)_{20}$, stearic acid $(EO)_{20}(PO)_{20}$ and lauryl alcohol $(EO)_{20}(PO)_{20}$.

DEINKING AGENT TEST EXAMPLE 1

According to J. TAPP pulp and paper test No. 39-82, this test was carried out. A test sample composed of offset printed waste newspaper 80% and waste leaflet 20% was subjected to a shredding to give $3 \times 3$ cm sized fractions. A certain amount of the fractions was charged in a pulper and then a warm water was poured therein. Thereafter, caustic soda 1.5%, 34% sodium silicate 3.0%, 30% hydrogen peroxide water 3.0% and each deinking agent (shown in the table 1) 0.3% were added thereinto to macerate the fractions for 10 minutes at 50° C. and age them for 1 hour at 50° C. Furthermore, water was added thereto to give a diluted slurry containing 1.0 wt. % of pulp, which was subjected to a flotation treatment for 10 minutes at 30° C. The pulp slurry was dewatered through 80 mesh wire filter to give a concentrate slurry containing 5% of pulp and then diluted with water to give a 1.0% pulp slurry. By means of a sheeting machine, a pulp sheet having 100 g/m$^2$ of basis weight was prepared from the slurry.

In the resulting pulp sheet, the brightness was measured by HUNTER brightness measuring apparatus according to JIS P8123. Residual carbon value was measured by simple measuring method of carbon in deinked pulp. The resulting pulp sheet was crushed and 100 mg thereof was charged into a mixed liquid of acetyl bromide/acetic acid (⅔ volume ratio) and cellose part was dissolved for 2 hours at 65°~70° C. The slurry was filtered through glassfiber filter (GS25, diameter=55 mm made by ADVANTIC TOYO). The filter was dried in air and was measured by color measuring system. As less residual ink remains in a resulting reproduced pulp sheet, the residual carbon L value becomes larger number. The results are indicated in the below Table 1.

EXAMPLE 14

352.5 g of DIACID-1550 from HARIMA CHEMICAL INDUSTRY Co. Ltd., which has 352.5 of average molecular weight, as dicarboxylic acid was fed into a pressure reactor and then 2.1 g of caustic potash was added thereto as catalyst. The mixture was heated to 170° C. and after nitrogen gas was filled in the reactor and deaerated under a reduced pressure, 264.3 g of ethylene oxide was blown thereinto over 3 hours with a pressure of 1~5 kg/cm$^2$ and was reacted with the mixture to obtain an addition polymer of ethylene oxide 6 mole as a deinking agent.

EXAMPLE 15

Reaction was carried under the same condition as the above Example 14, except using 881.0 g of ethylene oxide, to obtain an addition polymer of ethylene oxide 20 mole as a deinking agent.

EXAMPLE 16

DIACID-1550 from HARIMA CHEMICAL INDUSTRY Co. Ltd. and an excess methyl alcohol were reacted under a methanol reflux condition with use of a sulfuric acid catalyst to obtain a monoester and thereafter the excess methyl alcohol was removed under a reduced pressure to obtain a monoester having 113 of acid number and 367 of average molecular weight. 180.0 g of the monoester was fed into a pressure reactor and then 1.1 g of caustic potash was added thereto as catalyst. The mixture was heated to 170° C. and after nitrogen gas was filled in the reactor and deaerated under a reduced pressure, 649.0 g of ethylene oxide was blown thereinto over 3 hours with a pressure of $1\sim5$ kg/cm$^2$ and was reacted with the mixture to obtain an addition polymer of ethylene oxide 30 mole and propylene oxide 10 mole as a deinking agent.

EXAMPLE 17

DIACID-1550 and octyl alcohol were reacted with dehydration at 200°$\sim$250° C. to obtain a monoester and thereafter the excess octyl alcohol was removed under a reduced pressure to obtain a monoester having 89 of acid number and 465 of average molecular weight. 180.0 g of the monoester was fed into a pressure reactor and then 1.1 g of caustic potash was added thereto as catalyst. The mixture was heated to 170° C. and after nitrogen gas was filled in the reactor and deaerated under a reduced pressure, 682.5 g of ethylene oxide was blown thereinto over 3 hours with a pressure of $1\sim5$ kg/cm$^2$ and then 337.5 g of propylene oxide was blown thereinto over 5 hours with a pressure of $1\sim5$ kg/cm$^2$ to obtain an addition polymer of ethylene oxide 40 mole and propylene oxide 15 mole as a deinking agent.

EXAMPLE 18

DIACID-1550 and lauryl alcohol were reacted at 200°$\sim$250° C. to obtain a monoester and thereafter the excess lauryl alcohol was removed under a reduced pressure to obtain a monoester having 78 of acid number and 521 of average molecular weight. 180.0 g of the monoester was fed into a pressure reactor and then 1.1 g of caustic potash was added thereto as catalyst. The mixture was heated to 170° C. and after nitrogen gas was filled in the reactor and deaerated under a reduced pressure, 609.0 g of ethylene oxide was blown thereinto over 3 hours with a pressure of $1\sim5$ kg/cm$^2$ and then 100.4 g of propylene oxide was blown thereinto over 5 hours with a pressure of $1\sim5$ kg/cm$^2$ to obtain an addition polymer of ethylene oxide 40 mole and propylene oxide 5 mole as a deinking agent.

EXAMPLE 19

115.0 g of DIACID-1550 which has 352.5 of average molecular weight as dicarboxylic acid was fed into a pressure reactor and then 0.7 g of caustic potash was added thereto as catalyst. The mixture was heated to 170° C. and after nitrogen gas was filled in the reactor and deaerated under a reduced pressure, 862.3 g of ethylene oxide was blown thereinto over 4 hours with a pressure of $1\sim5$ kg/cm$^2$ and then 189.5 g of propylene oxide was blown thereinto over 4 hours with a pressure of $1\sim5$ kg/cm$^2$ to obtain an addition polymer of ethylene oxide 60 mole and propylene oxide 10 mole as a deinking agent.

EXAMPLE 20

Reaction was carried under the same condition as the above Example 6, except blowing ethylene oxide after propylene oxide, to obtain an addition polymer of ethylene oxide 60 mole and propylene oxide 10 mole as a deinking agent.

EXAMPLE 21

Reaction was carried under the same condition as the above Example 6, except blowing ethylene oxide and propylene oxide at the same time over 6 hours, to obtain a random addition polymer of ethylene oxide 60 mole and propylene oxide 10 mole as a deinking agent.

EXAMPLE 22

Reaction was carried under the same condition as the above Example 6, except using 574.8 g of ethylene oxide and 141.1 g of butylene oxide as alkylene oxide, to obtain an addition polymer of ethylene oxide 40 mole and butylene oxide 6 mole as a deinking agent.

EXAMPLE 23

Reaction was carried under the same condition as the above Example 6, except using 1724.5 g of ethylene oxide and 757.9 g of propylene oxide as an alkylene oxide and blowing ethylene oxide over 6 hours and propylene oxide over 8 hours, to obtain an addition polymer of ethylene oxide 120 mole and propylene oxide 40 mole as a deinking agent.

COMPARATIVE EXAMPLES 5~7

Reaction was carried out under the same condition as the above Examples, except using oleic acid, stearic acid and lauryl alcohol instead of the above dicarboxylic acid or dicarboxylic acid monoester, to obtain an addition polymer of oleic acid $(EO)_{20}(PO)_{10}$, stearic acid $(EO)_{20}(PO)_{10}$ and lauryl alcohol $(EO)_{25}(PO)_{10}$.

DEINKING AGENT TEST EXAMPLE 2

According to the above test 1, this test pulp sheet was prepared.

In the resulting pulp sheet, the brightness was measured by HUNTER brightness measuring apparatus according to JIS P8123. Residual carbon value was measured by simple measuring method of carbon in deinked pulp. The resulting pulp sheet was crushed and 100 mg thereof was charged into a mixed liquid of acetyl bromide/acetic acid ($\frac{1}{3}$ volume ratio) and cellose part was dissolved for 2 hours at 65°$\sim$70° C. The slurry was filtered through glassfiber filter (GS25, diameter=55 mm) made by ADVANTIC TOYO. The filter was dried in air and was measured by color measuring meter. As less residual ink remains in a resulting reproduced pulp sheet, the residual carbon L value becomes larger number. The results are indicated in the below Table 2. In comparison with Comparative Examples 5 to 8, it is apparent from the Table 2 that a resulting paper reproduced according to the present invention has an improved brightness and an decreased residual ink value.

EXAMPLE 24

HARIDIMER 250 from HARIMA CHEMICAL INDUSTRY Co. Ltd., which is made by polymerization of tall oil fatty acid to have 193 of acid number and 605 of average molecular weight and is composed of dimer acid 79 wt %, trimer acid 18 wt % and monomer acid 3 wt % and n-amyl alcohol were reacted under 130°~160° C. to have partial ester having 90 of acid number and 675 of average molecular weight. 675 g of the ester was fed into a pressure reactor and then 3.4 g of caustic potash was added thereto as catalyst. The mixture was heated to 170° C. to be deaerated and after nitrogen gas was filled in the reactor, 440.5 g of ethylene oxide was blown thereinto over 3 hours with a pressure of 1~5 kg/cm$^2$ to obtain an addition polymer of ethylene oxide 10 mole as a deinking agent.

EXAMPLE 25

HARIDIMER 250 and lauryl alcohol were reacted under 200°~250° C. to have partial ester of 79 of acid number and 773 of average molecular weight. 386.5 g of the ester was fed into a pressure reactor and then 1.9 g of caustic potash was added thereto as catalyst. The mixture was heated to 170° C. to be deaerated and after nitrogen gas was filled in the reactor, 881 g of ethylene oxide was blown thereinto over 5 hours with a pressure of 1~5 kg/cm$^2$ and was reacted with the mixture to obtain an addition polymer of ethylene oxide 40 mole as a deinking agent.

EXAMPLE 26

Ethylene oxide was blown into the partial ester which is prepared in Example 25 and then 580.8 g of propylene oxide was blown thereinto over 5 hours with a pressure of 1~5 kg/cm$^2$. They were reacted with the mixture to obtain an addition polymer of ethylene oxide 40 mole and propylene oxide 20 mole as a deinking agent.

EXAMPLE 27

193.3 g of the HARIDIMER 250 lauryl alcohol ester which is prepared in the same way as Example 25 was fed into a pressure reactor and then 1.0 g of caustic potash was added thereto as catalyst. The mixture was heated to 170° C. to be deaerated and after nitrogen gas was filled in the reactor, 881 g of ethylene oxide was blown thereinto over 5 hours with a pressure of 1~5 kg/cm$^2$ and then 290.4 g of propylene oxide was blown thereinto over 3 hours with a pressure of 1~5 kg/cm$^2$. They were reacted with the mixture to obtain a random addtion polymer of propylene oxide 80 mole and propylene oxide 20 mole as a deinking agent.

EXAMPLE 28

Reaction was carried out under the same condition as the above Example 27, except blowing ethylene oxide and propylene oxide at the same time over 8 hours, to obtain a random addition polymer of ethylene oxide 80 mole and propylene oxide 20 mole as a deinking agent.

EXAMPLE 29

Reaction was carried out under the same condition as the above Example 27, except blowing propylene oxide and thereafter ethylene oxide, to obtain an addition polymer of ethylene oxide 80 mole and propylene oxide 20 mole as a deinking agent.

EXAMPLE 30

Reaction was carried under the same condition as the above Example 27, except using 881 g of ethylene oxide and 90.1 g of butylene oxide, to obtain an addition polymer of ethylene oxide 80 mole and butylene oxide 5 mole.

EXAMPLE 31

HARIDIMER 250 and stearyl alcohol were reacted under 200°~250° C. to obtain a partial ester having 71 of acid number and 858 of average molecular weight. 171.6 g of the ester was fed into a pressure reactor and then 0.9 g of caustic potash was added thereto as catalyst. The mixture was heated to 170° C. to be deaerated and after nitrogen gas was filled in the reactor, 1321.5 g of ethylene oxide was blown thereinto over 7 hours with a pressure of 1~5 kg/cm$^2$ and was reacted to obtain an addition polymer of ethylene oxide 150 mole and propylene oxide 60 mole as a deinking agent.

EXAMPLE 32

HARIDIMER 500 from HARIMA CHEMICAL INDUSTRY Co. Ltd., which has 190 of acid number and 774 of average molecular weight and is composed of dimer acid 25 wt % and trimer acid 75 wt % and n-amyl alcohol were reacted under 130°~160° C. to obtain a partial ester having 72 of acid number and 879 of average molecular weight. Reaction was carried under a same condition as the above Example 31, except using 175.8 g of the ester and 0.9 g of caustic potash, to obtain an addition polymer of ethylene oxide 150 mole and propylene oxide 50 mole.

EXAMPLE 33

HARIDIMER 500 and lauryl alcohol were reacted under 200°~250° C. to obtain a partial ester having 97 of acid number and 942 of average molecular weight. Reaction was carried under a same condition as the above Example 27, except using 235.5 g of the ester and 1.2 g of caustic potash, to obtain an addition polymer of ethylene oxide 80 mole and propylene oxide 20 mole.

COMPARATIVE EXAMPLES 8~9

Reaction was carried under the same condition as the above Examples, except using oleic acid, stearic acid and lauryl alcohol instead of the above polymer acid, to obtain an addition polymer of oleic acid $(EO)_{20}(PO)_{10}$, stearic acid $(EO)_{20}(PO)_{10}$ and lauryl alcohol $(EO)_{20}(PO)_{10}$.

DEINKING AGENT TEST EXAMPLE 3

According to the above test 1, this test pulp sheet was prepared.

In the resulting pulp sheet, the brightness was measured by HUNTER brightness measuring apparatus according to JIS P8123. Residual carbon value was measured by simple measuring method of carbon in deinked pulp. The resulting pulp sheet was crushed and 100 mg thereof was charged into a mixed liquid of acetyl bromide/acetic acid (⅔ volume ratio) and cellose part was dissolved for 2 hours at 65°~70° C. The slurry was filtered through glassfiber filter (GS25, diameter=55 mm) made by ADVANTIC TOYO. The filter was dried in air and was measured by color difference meter. As less residual ink remains in a resulting reproduced pulp sheet, the residual carbon L value becomes larger number. The results are indicated in the below Table 3.

TABLE 1

| No. | DEINKING AGENT | COMPOSITION | | | | RESULT | |
|---|---|---|---|---|---|---|---|
| | | addition number | | | addition state | brightness (%) | residual carbon (L value) |
| | | EO | PO | BO | | | |
| Example | | | | | | | |
| 1 | HARIDIMER-250 $(EO)_6$ | 6 | — | — | BLOCK | 50.3 | 70.5 |
| 2 | HARIDIMER-250 $(EO)_{40}$ | 40 | 0 | — | " | 52.3 | 74.3 |
| 3 | HARIDIMER-250 $(EO)_{20}(PO)_{20}$ | 20 | 20 | — | " | 51.7 | 73.7 |
| 4 | HARIDIMER-250 $(EO)_{40}(BO)_{10}$ | 40 | — | 10 | " | 52.5 | 74.2 |
| 5 | HARIDIMER-250 $(EO)_{40}(PO)_{20}$ | 40 | 20 | — | " | 52.3 | 75.6 |
| 6 | HARIDIMER-250 $(EO)_{40}(PO)_{40}$ | 40 | 40 | — | " | 53.1 | 74.2 |
| 7 | HARIDIMER-250 $(EO_{40} \cdot (PO_{40}))$ | 40 | 40 | — | RANDUM | 54.4 | 77.0 |
| 8 | HARIDIMER-250 $(PO)_{40}(EO)_{40}$ | 40 | 40 | — | BLOCK | 54.0 | 76.2 |
| 9 | HARIDIMER-250 $(EO)_{40}(PO)_{80}$ | 40 | 80 | — | " | 53.4 | 76.0 |
| 10 | HARIDIMER-250 $(EO)_{100}(PO)_{100}$ | 100 | 100 | — | " | 52.6 | 71.4 |
| 11 | HARIDIMER-300 $(EO)_{40}(PO)_{40}$ | 40 | 40 | — | " | 53.6 | 75.7 |
| 12 | HARIDIMER-500 $(EO)_{60}(PO)_{60}$ | 60 | 60 | — | " | 54.2 | 76.3 |
| 13 | HARIDIMER-500 $(EO)_{90}(PO)_{30}$ | 90 | 30 | — | " | 53.6 | 76.0 |
| Comparative | | | | | | | |
| 1 | STEARIC ACID | — | — | — | — | 47.0 | 63.2 |
| 2 | OLEIC ACID $(EO)_{20}(PO)_{10}$ | 20 | 20 | — | BLOCK | 48.9 | 67.7 |
| 3 | OLEIC ACID $(EO)_{20}(PO)_{20}$ | 20 | 20 | — | " | 49.4 | 68.0 |
| 4 | STEARIC ACID $(EO)_{20}(PO)_{20}$ | 20 | 20 | — | " | 50.6 | 69.7 |
| 5 | LAURYL ALCOHOL $(EO)_{20}(PO)_{20}$ | 20 | 20 | — | " | 48.3 | 64.5 |

NOTE:
EO = ethylene oxide; PO = propylene oxide; BO = butylene oxide

TABLE 2

| No. | DEINKING AGENT | COMPOSITION | | | | RESULT | |
|---|---|---|---|---|---|---|---|
| | | addition number | | | addition state | brightness (%) | residual carbon (L value) |
| | | EO | PO | BO | | | |
| Example | | | | | | | |
| 14 | DICARBOXYLIC ACID $(EO)_6$ | 6 | — | — | BLOCK | 50.0 | 70.3 |
| 15 | DICARBOXYLIC ACID $(EO)_{20}$ | 20 | — | — | " | 52.8 | 74.6 |
| 16 | DICARBOXYLIC ACID MONOMETYL $(EO)_{30}(PO)_{10}$ | 30 | 10 | — | " | 54.5 | 77.0 |
| 17 | DICARBOXYLIC ACID MONOOCTYL $(EO)_{40}(PO)_{15}$ | 40 | 15 | — | " | 55.6 | 77.6 |
| 18 | DICARBOXYLIC ACID MONOLAURYL $(EO)_{40}(PO)_5$ | 40 | 5 | — | " | 55.4 | 77.5 |
| 19 | DICARBOXYLIC ACID $(EO)_{60}(PO)_{10}$ | 60 | 10 | — | " | 56.2 | 78.2 |
| 20 | DICARBOXYLIC ACID $(PO)_{10}(EO)_{60}$ | 60 | 10 | — | " | 56.0 | 78.0 |
| 21 | DICARBOXYLIC ACID $(EO_{60}PO_{10})$ | 60 | 10 | — | RANDOM | 56.4 | 78.2 |
| 22 | DICARBOXYLIC ACID $(EO)_{40}(BO)_6$ | 40 | — | 6 | BLOCK | 55.0 | 77.3 |
| 23 | DICARBOXYLIC ACID $(EO)_{120}(PO)_{40}$ | 120 | 40 | — | " | 53.8 | 75.4 |
| Comparative | | | | | | | |
| 1 | STEARIC ACID | — | — | — | — | 47.5 | 63.3 |
| 5 | OLEIC ACID $(EO)_{20}(PO)_{10}$ | 20 | 10 | — | BLOCK | 49.2 | 67.9 |
| 6 | STEARIC ACID $(EO)_{20}(PO)_{10}$ | 20 | 10 | — | " | 49.6 | 68.2 |
| 7 | LAURYL ALCOHOL $(EO)_{25}(PO)_{10}$ | 25 | 10 | — | " | 48.8 | 67.0 |

NOTE:
EO = ethylene oxide; PO = propylene oxide; BO = butylene oxide

TABLE 3

| No. | DEINKING AGENT | COMPOSITION | | | | RESULT | |
|---|---|---|---|---|---|---|---|
| | | addition number | | | addition state | brightness (%) | residual carbon (L value) |
| | | EO | PO | BO | | | |
| Example | | | | | | | |
| 24 | DA-250 AMYL $(EO)_{10}$ | 10 | — | — | BLOCK | 50.5 | 69.7 |
| 25 | DA-250 LAURYL $(EO)_{40}$ | 40 | — | — | " | 54.1 | 72.0 |
| 26 | DA-250 LAURYL $(EO)_{40}(PO)_{20}$ | 40 | 20 | — | " | 55.2 | 74.0 |
| 27 | DA-250 LAURYL $(EO)_{80}(BO)_{20}$ | 80 | 20 | — | " | 56.1 | 76.4 |
| 28 | DA-250 LAURYL $(EO_{80}/PO_{20})$ | 80 | 20 | — | RANDOM | 56.2 | 76.5 |
| 29 | DA-250 LAURYL $(PO)_{20}(EO)_{80}$ | 80 | 20 | — | BLOCK | 56.0 | 76.2 |
| 30 | DA-250 LAURYL $(EO)_{80}(BO)_5$ | 80 | — | 5 | " | 55.8 | 75.5 |
| 31 | DA-250 STEARYL $(EO)_{150}(PO)_{50}$ | 150 | 50 | — | " | 54.2 | 72.3 |
| 32 | DA-500 AMYL $(EO)_{150}(PO)_{50}$ | 150 | 50 | — | " | 54.4 | 72.5 |
| 33 | DA-500 LAURYL $(EO)_{80}(PO)_{20}$ | 80 | 20 | — | " | 55.9 | 76.0 |
| Comparative | | | | | | | |
| 1 | STEARIC ACID | — | — | — | — | 47.2 | 63.6 |

TABLE 3-continued

| No. | DEINKING AGENT | COMPOSITION addition number EO | PO | BO | addition state | RESULT brightness (%) | residual carbon (L value) |
|---|---|---|---|---|---|---|---|
| 2 | OLEIC ACID $(EO)_{20}(PO)_{10}$ | 20 | 10 | — | BLOCK | 49.0 | 68.0 |
| 8 | STEARIC ACID $(EO)_{20}(PO)_{10}$ | 20 | 10 | — | " | 50.4 | 69.2 |
| 9 | LAURYL ALCOHOL $(EO)_{20}(PO)_{10}$ | 25 | 10 | — | " | 48.6 | 67.7 |

NOTE:
DA-250 = Haridimer - 250; DA-500 = Haridimer - 500
EO = ethylene oxide; PO = propylene oxide; BO = butylene oxide

What is claimed:

1. A deinking agent for recycling waste papers selected from the group consisting of;
   (a) agents made by adding alkylene oxides to dimer acids, polymer acids, or combinations thereof, wherein said acids are higher unsaturated fatty acids having a carbon number of 16-20;
   (b) agents made by adding alkylene oxides to partial esters, wherein said esters are formed by condensing an alcohol, having a carbon number of 1-18, with a dimer acid, a polymer acid, or a combination thereof, said acids being higher unsaturated fatty acids having a carbon number of 16-20; and
   (c) agents made by adding alkylene oxides to dicarboxylic acids, dicarboxylic acid monoesters, or a combination thereof, wherein said dicarboxylic acids and said monoesters are represented by the following formula (I):

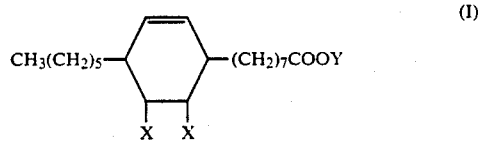

(I)

wherein one of the Xs is COOH and the other X is H or $CH_3$; Y is H or R and R is an alkyl group having a carbon number of 1-18.

2. Deinking agent according to claim 1, wherein alkylene oxide is one or more selected from the group comprising ethylene oxide, propylene oxide and butylene oxide.

3. Deinking agent according to claim 1, wherein the addition molar number of the alkylene oxide is 10~200.

4. Deinking agent according to claim 1, wherein alkylene oxide is the combination of ethylene oxide and propylene oxide and both oxides are added in a random or block state.

5. A deinking composition for recycling waste papers comprising:
   (1) a deinking agent selected from the group consisting of
      (a) agents made by adding alkylene oxides to dimer acids, polymer acids, or combinations thereof, wherein said acids are higher unsaturated fatty acids having a carbon number of 16-20;
      (b) agents made by adding alkylene oxides to partial esters, wherein said esters are formed by condensing an alcohol, having a carbon number of 1-18, with a dimer acid, a polymer acid, or a combination thereof, said acids being higher unsaturated fatty acids having a carbon number of 16-20; and
      (c) agents made by adding alkylene oxides to dicarboxylic acids, dicarboxylic acid monoesters, or a combination thereof, wherein said dicarboxylic acids and said monoesters are represented by the following formula (I):

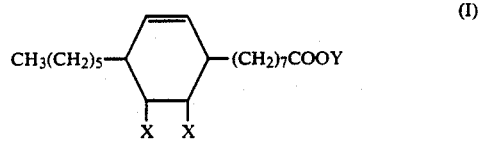

(I)

wherein one of the Xs is COOH and the other X is H or $CH_3$; Y is H or R and R is an alkyl group having a carbon number of 1-18; and
   (2) a compound selected from the group consisting of anion activators, nonionic active agents, and higher fatty acids.

* * * * *